Nov. 22, 1966 — B. GRABOVAC — 3,286,504
LOW TORQUE METER
Filed April 9, 1964 — 2 Sheets-Sheet 2
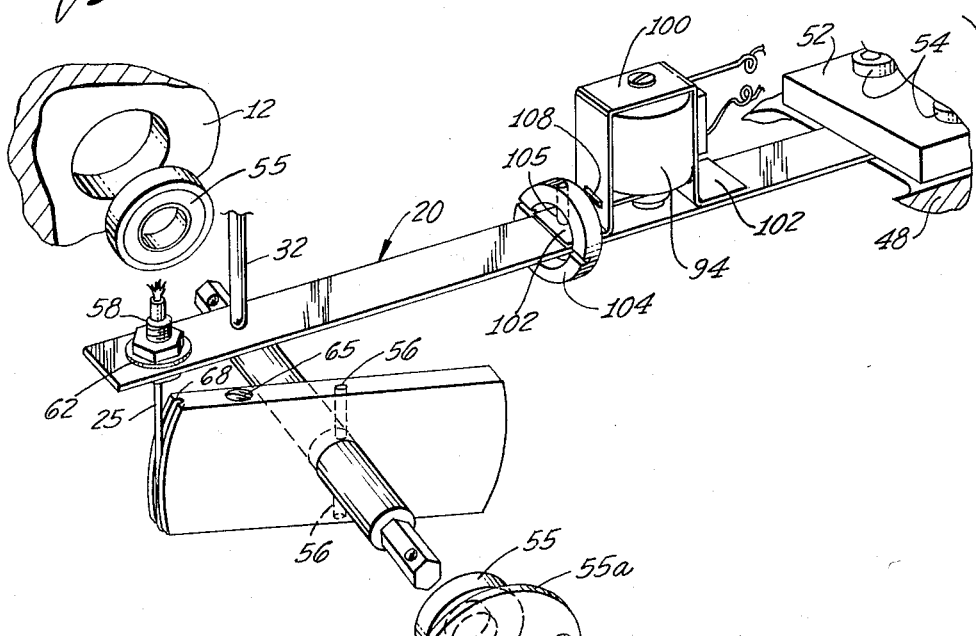
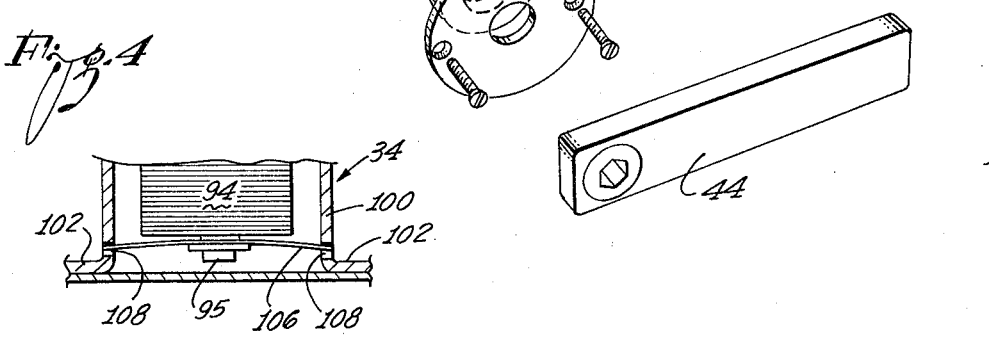
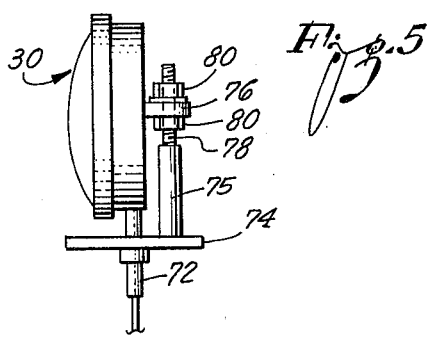
INVENTOR.
Bosko Grabovac
Attorneys United States Patent Office 3,286,504
Patented Nov. 22, 1966

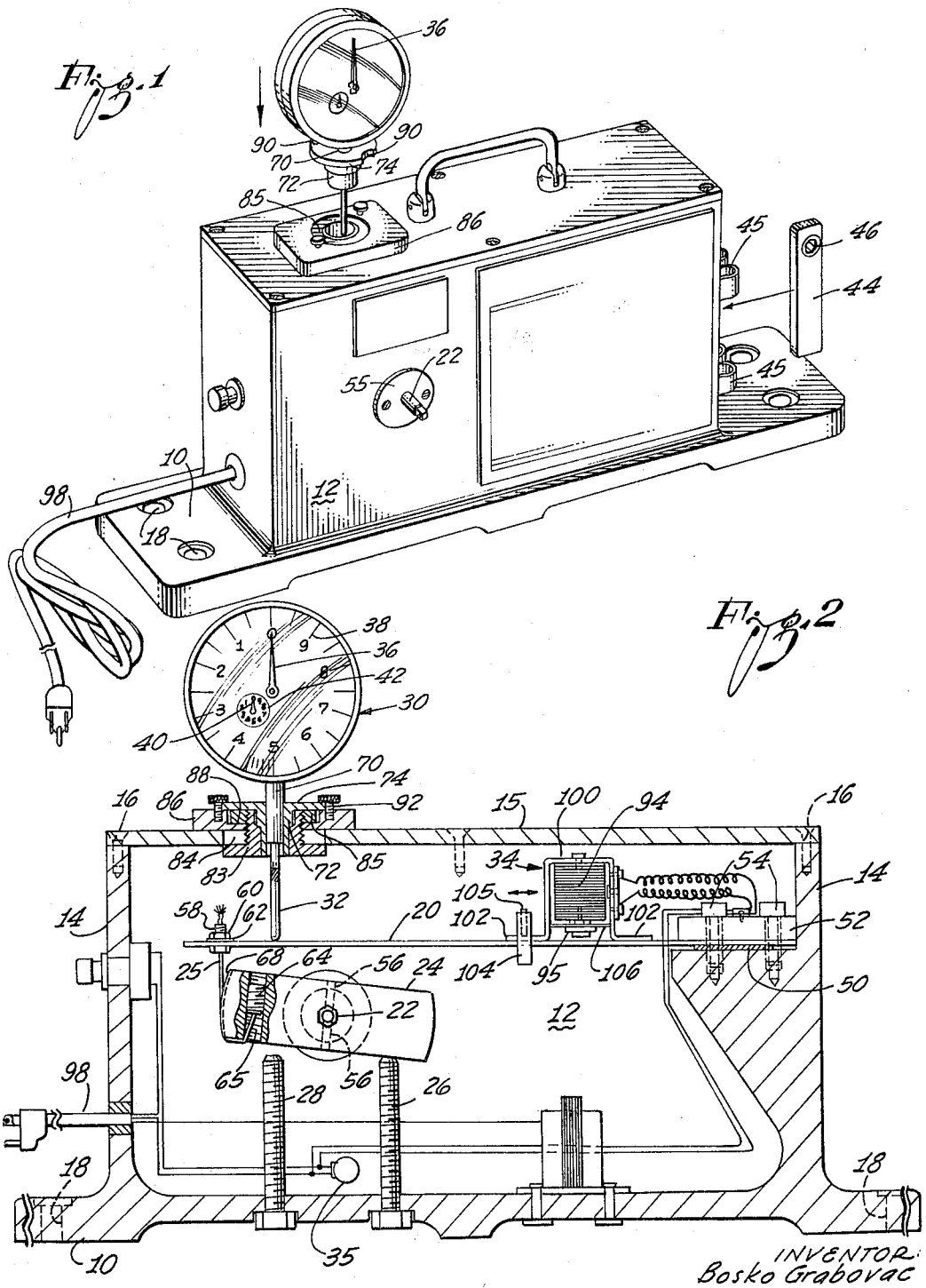

3,286,504
LOW TORQUE METER
Bosko Grabovac, Altadena, Calif., assignor to Torque Controls, Inc., San Gabriel, Calif., a corporation of California
Filed Apr. 9, 1964, Ser. No. 358,580
12 Claims. (Cl. 73—1)

This invention relates to a device for measuring torques in general and specifically for testing and calibrating torque measuring instruments and tools. More particularly, the invention relates to a torque measuring device which employs a resiliently flexible cantilever beam for force measurement, the invention being directed to improvements to make such a device highly accurate in the measurement of torque forces and especially torque forces of relatively low magnitude.

My copending application Ser. No. 196,747, now Patent No. 3,200,632, discloses a device of this type for measuring torques of relatively high magnitude in terms of inch-pounds or foot-pounds. In this prior measuring device, a radial arm on a torque input shaft carries a roller in contact with one surface of the resilient cantilever beam and flexure of the beam is measured by a dial indicator in contact with the surface on the other side of the beam.

The described prior device serves its purpose well and has been widely accepted. There has developed a need, however, for higher standards of accuracy than heretofore required and especially need for close accuracy in measuring low magnitude torques in terms of ounce-inch and gram-centimeters.

It has been found from close study and experimentation that to meet the higher standards of accuracy and especially the need for greater sensitivity in the lower torque ranges attention must be given to certain factors which heretofore have not required special consideration. One of these factors is the shifting of the point on the resilient beam where torque forces are transmitted to the beam by the roller on the radial input arm. Another factor is the friction involved in the movement of the roller along the surface of the beam. Another factor is that the effect of the weight of the radial input arm on torque measurements varies with the angular movement of the arm. A further factor is the static friction among the parts including the mechanism for flexing the beam as well as the mechanism of the dial indicator. A still further factor is that it is difficult to functionally relate the dial indicator to the resilient beam to cause the dial to record flexure of the beam with accuracy and record precisely zero when no input force is transmitted to the beam. Error can arise only too easily in failure of the dial indicator to respond to flexure of the beam with sufficient sensitivity.

The present invention provides a number of features to eliminate these various sources of error. These features work together to make it possible to reach the newer higher standards of torque measurement.

Inaccuracy arising from shifting of the point of force transmittal to the resilient beam and inaccuracy caused by the friction of the roller are both eliminated by employing a flexible non-resilient cord to connect the radial input arm to the resilient beam with the cord at all times extending tangentially from a concentric arcuate end surface of the input arm. The changing effect of the weight of the input arm with changes in the inclination of the arm is eliminated by substituting a balanced rocker for the radial arm. In effect the single input arm is replaced by a diametrical pair of radial arms with the weight of one arm canceling the weight of the other arm.

The invention meets the problem of eliminating static friction by applying vibratory energy to the torque measuring device. In the preferred practice of the invention the vibratory force is applied directly to the resilient beam and is transmitted by the resilient beam both to the input mechanism and to the mechanism of the dial indicator.

The problem of eliminating lost motion and back lash as well as the problem of eliminating error in the cooperation of the dial indicator with the resilient beam is solved by preloading the beam as well as the dial indicator and by arranging for the dial indicator to be progressively unloaded instead of progressively loaded by the torque-responsive flexure of the beam. Thus at zero reading the dial indicator is preloaded in accord with the maximum flexure of the beam in the range of values that are to be measured and the dial indicator is progresively relaxed as the beam is progressively stressed by the input force, the graduated scales of the indicator gage being reversed from conventional practice. With this arrangement the sensing element or feeler of the dial indicator is spring-pressed against the resilient beam throughout the whole range of operation and is under maximum loading at the lower end of the range where sensitivity to torque forces is usually difficult to obtain.

As will be explained, the invention provides further features relating to the fabrication and calibration of the device and relating to the construction and mounting of the means to generate the vibratory energy.

The various features and advantages of the invention may be understood from the following detailed description and the accompanying drawings.

In the drawings, which are to be regarded as merely illustrative:

FIG. 1 is a perspective view of the presently preferred embodiment of the device with both the indicator gage and the test arm withdrawn from their normal positions;

FIG. 2 is a longitudinal sectional view of the device;

FIG. 3 is an exploded perspective view showing various working parts of the device together with the test arm;

FIG. 4 is a fragmentary sectional view of the vibrator; and

FIG. 5 is an elevational view showing calibration means for shifting the indicator gage relative to the beam.

GENERAL ARRANGEMENT

The preferred embodiment of the invention shown in the drawings has a housing incorporating a base plate 10, the housing having longitudinal side walls 12, two end walls 14, and a top wall 15 that is removably secured by screws 16. The base plate 10 has suitable apertures 18 at its opposite ends to facilitate anchoring the device to a horizontal support surface such as a workbench.

The principal working parts of the device include: a resiliently yieldable means in the form of a cantilever beam 20; rotary input means to receive the torque forces that are to be measured, the rotary input means comprising a transverse input shaft 22 and a balanced rocker body 24 carried thereby, the opposite ends of the input shaft being of hexagonal configuration and protruding from the opposite sides of the housing; means operatively connecting the rotary input means with the beam 20 for flexure thereof, the connecting means comprising an elongated flexible member in the form of a non-resilient cord 25 that extends from the rocker body 24 to the beam; restraining means to normally hold the beam under a given degree of flexure, which restraining means may act directly on the beam, but in this instance acts on the rocker body 24, the restraining means comprising a stop screw 26 which limits clockwise rotation of the rocker body; a second stop screw 28 to limit the counterclockwise rotation of the rocker body and thereby limit flexure of the beam; a spring-biased indicator gage or dial indicator 30 having a sensing element in the form of the stem 32 in contact with the beam 20; a vibrator, generally designated 34, the vibrator being mounted directly on the beam; and indicating means in the form of an indicator lamp 35 in parallel with the vibrator 34 to indicate when the vibrator is in operation.

The function of the restraining means is to preload the beam 20 by normally holding the beam slightly flexed in one respect. As may be seen in FIG. 2, the outer end beam is flexed downward by the restraining means. In accord with the teaching of the invention, the spring-biased indicator gage is also normally preloaded, which is to say that the sensing stem 32 of the indicator gage is normally retracted to a given degree by contact with the beam 20 when the sole load on the beam is the load imposed by the restraining means or stop screw 26 restraining the rocker body 24. It is to be particularly noted that the dial indicator 30 is normally preloaded by the contact of the stem 32 against the beam 20, the spring force of the dial gage tending to flex the beam downward. Consequently downward flexure of the beam by an input torque force results in corresponding unloading of the beam. Thus the progressive application of an input torque force causes the pointer means of the dial indicator to rotate in the direction that is opposite from the usual direction.

The pointer means comprises a long pointer 36 which rotates counterclockwise along an outer scale 38 as the gage is unloaded and a short pointer 40 which rotates clockwise along an inner circular scale 42 as the gage is unloaded. One revolution of the outer pointer causes $\frac{1}{10}$ of a revolution of the inner pointer. With the small inner scale 42 divided into ten units and the outer scale 38 divided into one hundred units, the full range of measurement of the dial indicator is one thousand units. Obviously the dial gage must be preloaded to whatever degree is necessary for the full range of values that are to be measured by the device. Thus if the range to be measured is 100 ounce-inches, the normal or starting loading of the dial indicator must be in excess of the flexure of the beam that would be created by an input torque force of 100 ounce-inches.

OPERATION

With the described device properly calibrated and with both the beam 20 and the indicator gage preloaded in the described manner, a counterclockwise torque to be measured may be applied to the exposed end of the shaft 22 that is shown in FIG. 1 or a clockwise torque that is to be measured may be applied to the opposite end of the shaft. With the vibrator 34 in operation, static friction is substantially eliminated among the working parts, the vibratory force being transmitted both to the sensing stem 32 of the dial indicator and to the rocker body 24 that is mounted on the input shaft 22. The applied force pulls on the cord 25 to increase the flexure of the beam 20 and the increased flexure of the beam permits corresponding extension of the sensing stem 32 of the dial indicator to unload the dial indicator to a corresponding degree. The extension of the sensing stem 32 causes corresponding rotation of the two pointer hands 36 and 40 to indicate the magnitude of the applied torque force. Since the indicator gage 30 is preloaded by its contact with the beam 20, the force exerted against the beam 20 by the concealed spring of the dial indicator has no effect whatsoever on the accuracy of the device. The vibrations created by the vibrator 34 are transmitted to the dial indicator to keep static friction within the dial indicator from being a factor in the measurement of forces. The vibrations are also transmitted through the cord 25 to the balanced rocker body 24 and the input shaft 22 on which it is mounted.

To maintain the operation of the device at a high level of accuracy, it should be tested from time to time. For this purpose a test arm 44 is provided and is normally frictionally carried by a pair of spring clips 45 on one end of the housing. The test arm 44 is a short metal bar with an aperture 46 in one of its ends, the aperture being of hexagonal configuration to fit onto one of the two ends of the shaft 22. With the device calibrated to measure torques in terms of ounce-inches the test arm 44 is dimensioned to apply a given torque to the shaft 22, the given torque arising from the weight of the test arm. In the preferred practice of the invention the test arm exerts a torque of 5 ounce-inches when the torque arm is placed on the end of the input shaft 22. With the test arm 44 in position on one of the ends of the input shaft 22 the long pointer 36 should be swung to the point on the scale 38 that indicates 5 ounce-inches. If the pointer does not indicate 5 ounce-inches the outer scale is rotated until it does so, the outer scale being rotatable for this purpose.

STRUCTURAL DETAILS

The housing of the device may be made of aluminum and a portion of the end wall 14 may be thickened to form a heavy shelf 48 to support the fixed end of the beam 20. In the construction shown, a steel shim 50 is interposed between the base end of the beam 20 and the shelf 48 and a steel block 52 is superimposed on the base end of the beam. The steel block 52 is anchored to the shelf 48 by two pairs of cap screws 54 that straddle both the beam and the shim. This arrangement makes possible a simple method of calibrating the effective length of the beam 20.

At the start of the calibration procedure, the steel shim 50 is advanced towards the free end of the beam to such extent as to make the effective length of the beam too short. Then with the four cap screws 54 only moderately tight, the beam 20 may be tested for resistance to flexure and the steel shim may be shifted by tapping the end of the steel shim until the effective length of the shim reaches the desired magnitude.

The opposite ends of the input shaft 22 are journaled in suitable bearings 55 (FIG. 3) behind retaining disks 55a in two side walls 12 of the housing and the balanced rocker body 24 is fixedly mounted on the shaft by a pair of opposed set screws 56.

The cord 25 may connect the balanced rocker body 24 with the beam 20 in any suitable manner. In the construction shown, one end of the cord is anchored in a hollow screw 58 which extends through the free end of the beam and is secured by a nut 60 in cooperation with a washer 62. The other end of the cord is anchored in a hollow headless screw 64 in a threaded bore 65 in the rocker body 24. It is to be noted in FIG. 2 that the cord 25 lies along a concentrically curved end surface of the rocker body 24 so that the cord extends tangentially of the curvature of the end surface throughout the range of oscillation of the rocker body. Preferably, the peripheral surface forms a groove 68 to confine the cord 25 from two sides.

It is apparent that with the beam 20 held under a normal or starting degree of flexure by the stop 26 acting against the rocker body 24, the degree of the normal flexure may be varied either by adjusting the stop screw 26 to vary the normal position of the rocker body 24 or by adjusting the headless screw 64 to vary the effective length of the cord 25. In this embodiment of the invention it is contemplated that the calibration will be accomplished solely by adjustment of the hollow screw 64.

The dial indicator 30 may be mounted in the upper housing wall 15 in any suitable manner. In the preferred practice of the invention, the dial indicator is mounted in a manner that not only makes it possible to remove the dial indicator when the device is not in use, but also makes it possible to turn the face of the dial indicator in any direction to suit the convenience of the operator.

In the present embodiment of the invention, the shank 70 of the dial indicator in which the sensing stem 32 reciprocates is slidingly mounted in a bushing 72 that is formed with a radial flange 74. As shown in FIG. 5, an upstanding post 75 is mounted on the radial flange 74 of the bushing for the purpose of adjustably supporting the dial indicator 30 in the bushing 72. The back plate of the dial indicator is formed with an apertured ear 76 and the upper screw threaded end 78 of the post 75 extends through the apertured ear with the ear gripped by a pair of opposed nuts 80. It is apparent that the dial indicator may be raised or lowered relative to the bushing 72 by adjustment of the pair of opposed nuts 80.

When the dial indicator 30 is in use, the bushing 72 is seated in a complementary bushing 83 (FIG. 2) that extends through a longitudinal slot 84 in the top wall 15 of the housing. The complementary bushing 83 is secured by a cooperating ring-shaped nut 85 and an associated washer 86, the washer being of rectangular configuration and being cut away to form a recess 88 for the ring-shaped nut.

As shown in FIG. 1, the periphery of the radial flange 74 of the bushing 72 of the dial indicator is provided with a pair of diametrically opposite notches 90 which are dimensioned to clear the knurled heads of a pair of thumb screws 92. It is apparent that for the purpose of calibration, the ring-shaped nut 85 may be loosened to permit the position of the dial indicator to be adjusted along the length of the slot 84. When the dial indicator is in use, the two thumb screws 92 grip the radial flange 74 of the dial indicator bushing 72 to hold the dial indicator firmly in place, the two notches 90 being rotated away from the two thumb screws. To remove the dial indicator, it is merely necessary to loosen the two thumb screws 92 and then to rotate the dial indicator to bring the two notches 90 into register with the heads of the two screws 92.

The sensing stem 32 of the dial indicator is removable and may be selected from sensing stems of various lengths. In installing the dial indicator 30, the first step is to select a sensing stem 32 of an appropriate length. When the dial indicator is in position as shown in FIG. 2 with the sensing stem 32 in contact with the restrained beam 20, the two nuts 80 may be manipulated to adjust the dial indicator up or down to preload the dial indicator to the desired degree. Once the dial indicator is installed and preloaded, the test arm 44 may be mounted on the input shaft and then the outer scale 38 of the dial indicator may be rotated until the long pointer 36 indicates on the scale the particular torque value that corresponds to the test arm.

The vibrator 34 may be of the construction shown in FIGS. 2, 3 and 4, the vibrator having a coil 94 and a movable armature 95. The coil 94 may be energized with alternating current of 8 to 10 volts supplied by a transformer 96 and the transformer may be connected to a suitable 110 volt source by a dual conductor cord 98. The indicator lamp 35 is in parallel with the transformer to be energized whenever the vibrator coil 94 is energized.

In the construction shown, the vibrator coil 94 is adjustably mounted in a U-shaped frame 100 which has oppositely directed base flanges 102. The yoke frame is mounted on the resilient beam 20 by clamp means comprising a ring 104 (FIGS. 2 and 3) and a radial set screw 105 which is tightened against one of the two base flanges 102 of the frame. It is to be noted that of the two base flanges 102, the one that is closer to the free end of the beam is the one that is clamped to the beam, the other base flange being free. Since the free end of the beam curves downward when flexed by an input force, the free base flange 102 is usually spaced slightly from the beam when an input force is being measured.

The armature 95 is connected to a leaf spring 106 and, as shown in FIG. 4, the opposite ends of the leaf spring extend into corresponding slots 108 in the two legs of the frame 100. The coil 94 is intermittently energized at 60 cycles per second and when it is energized it lifts the armature 95 with consequent upward bowing of the leaf spring 106 as shown in FIG. 4. When the coil 94 is intermittently deenergized it releases the armature 95 to permit the leaf spring 106 to snap the armature downward against the surface of the resilient beam 20. It is to be noted that two adjustments are available, one adjustment being to raise or lower the coil 94 relative to the frame 100, the other adjustment being to shift the frame 100 along the length of the resilient beam. In practice it is a simple matter to find by trial and error an optimum adjustment of the vibrator.

My description in specific detail of the selected embodiment of the invention will suggest various changes, substitutions and other departures from my disclosure within the spirit and scope of the appended claims.

I claim:

1. In a device to measure forces over a given range of values, the combination of:
   a flexible beam rigidly anchored at one end with the other end free to flex;
   restraining means engaging the other end of the beam and flexing the beam in one lateral direction to a given degree with the beam free to flex in said one lateral direction beyond the given degree;
   a spring-biased indicator gage under load by the beam with the spring force of the gage urging flexure of the beam in said lateral direction;
   said gage having a scale covering the given range of values with the scale rising in the direction of unloading of the gage; and
   means to apply forces to be measured against said beam in said one lateral direction to flex the beam beyond the given degree and thus correspondingly unload the gage.

2. A combination as set forth in claim 1 in which said means to apply forces to be measured comprises:
   rotary means for actuation by torque forces; and
   means operatively connecting an eccentric point of said rotary means to the beam.

3. A combination as set forth in claim 1 which includes means to vibrate the beam to overcome static friction.

4. In a device to measure torque forces over a given range of values, the combination of:
   a flexible beam rigidly anchored at one end with the other end free to flex;
   restraining means engaging the other end of the beam and flexing the beam in one lateral direction to a given degree with the beam free to flex in said one lateral direction beyond the given degree;
   a spring-biased indicator gage under load by the beam with the spring force of the gage urging flexure of the beam in said lateral direction, said gage having a scale covering the given range of torque values with the scale rising in the direction of unloading of the gage;
   rotary input means to receive torque forces to be measured, a portion of the rotary input means having a concentric peripheral surface; and
   elongated flexible means connecting said rotary input means with the beam to flex the beam in said one lateral direction beyond the given degree and thus correspondingly unload the indicator gage;
   said elongated flexible means lying against said concentric peripheral surface to extend tangentially therefrom to the beam throughout the given range of torque values.

5. A combination as set forth in claim 4 which includes means to vary the effective length of the elongated flexible means for the purpose of calibration.

6. A combination as set forth in claim 4 which includes means to adjust the position of the indicator gage relative to the beam for the purpose of calibration.

7. A combination as set forth in claim 4 which includes means to adjust the position of the indicator gage longitudinally of the beam for the purpose of calibration.

8. In a device to measure forces over a given range of values, the combination of:
   a flexible beam rigidly anchored at one end with the other end free to flex;
   restraining means engaging the other end of the beam and flexing the beam in one lateral direction to a given degree with the beam free to flex in said one lateral direction beyond the given degree;
   a spring-biased indicator gage under load by the beam with the spring force of the gage urging flexure of the beam in said lateral direction;
   said gage having a scale covering the given range of values with the scale rising in the direction of unloading of the gage;
   means to apply forces to be measured against said beam in said one lateral direction to flex the beam beyond the given degree and thus correspondingly unload the gage; and
   a vibrator positioned to impart vibration directly to the beam to overcome static friction when input forces are transmitted to the beam.

9. A combination as set forth in claim 8 in which means carrying the vibrator mechanism is attached directly to the beam for support of the vibrator mechanism with the point of attachment spaced away from the vibrator mechanism in the direction of the free end of the beam.

10. A combination as set forth in claim 8 which includes a transformer adapted to be plugged into a circuit to energize the vibrator;
    and which further includes an indicator lamp responsive to energization of the vibrator to indicate when the vibrator is in operation.

11. In a device to measure forces over a given range of values, the combination of:
    a resilient beam anchored at one end for flexure of the other end in one lateral direction in accord with the magnitude of a force applied thereto;
    a spring-biased indicator gage under load by the beam with the spring force of the gage urging flexure of the beam in said one lateral direction, said gage having a scale covering the given range of values;
    rotary input means to receive torques that are to be measured, said rotary input means having a concentric peripheral portion;
    elongated flexible means connecting said rotary input means with the beam to flex the beam in said one lateral direction and thus correspondingly unload the indicator gage;
    said elongated flexible means lying against said concentric peripheral surface to extend tangentially therefrom to the beam throughout the given range of torque values; and
    restraining means in the path of rotation of the rotary means to block rotation thereof in a rotary direction to fix a starting position for the input means and to maintain the beam under a normal starting stress in the absence of an input force.

12. A combination as set forth in claim 11 which includes means to vary the effective length of the elongated flexible means.

References Cited by the Examiner

UNITED STATES PATENTS

| | | | |
|---|---|---|---|
| 2,377,869 | 6/1945 | Elliott | 73—95 |
| 2,396,383 | 3/1946 | Moore. | |
| 2,612,042 | 9/1952 | Clark | 73—141 |
| 2,635,453 | 4/1953 | Gentry et al. | 73—1 |
| 3,015,952 | 1/1962 | Clagett | 73—141 |
| 3,062,057 | 11/1962 | Glaser et al. | 73—432 |

RICHARD C. QUEISSER, *Primary Examiner.*

C. A. RUEHL, *Assistant Examiner.*